United States Patent
Keil et al.

(10) Patent No.: US 12,126,898 B2
(45) Date of Patent: Oct. 22, 2024

(54) CONTROL DEVICE FOR A MOTION PICTURE CAMERA AND CONTROL METHOD

(71) Applicant: Arnold & Richter Cine Technik GmbH & Co. Betriebs KG, Munich (DE)

(72) Inventors: Karl Keil, Berlin (DE); Hendrik Voss, Munich (DE)

(73) Assignee: Arnold & Richter Cine Technik Gmbh & Co. Betriebs KG, Munich (DE)

( * ) Notice: Subject to any disclaimer, the term of this patent is extended or adjusted under 35 U.S.C. 154(b) by 154 days.

(21) Appl. No.: 17/869,999

(22) Filed: Jul. 21, 2022

(65) Prior Publication Data

US 2023/0021875 A1   Jan. 26, 2023

(30) Foreign Application Priority Data

Jul. 23, 2021 (DE) .......................... 102021119161.0

(51) Int. Cl.
*H04N 23/667* (2023.01)
*G03B 19/18* (2021.01)

(52) U.S. Cl.
CPC ........... *H04N 23/667* (2023.01); *G03B 19/18* (2013.01)

(58) Field of Classification Search
None
See application file for complete search history.

(56) References Cited

U.S. PATENT DOCUMENTS

| | | | | |
|---|---|---|---|---|
| 5,521,663 A | * | 5/1996 | Norris, III | ............ G03B 17/24 396/312 |
| 2009/0231492 A1 | * | 9/2009 | Wayne | ................. G11B 27/322 348/E5.022 |
| 2011/0085025 A1 | * | 4/2011 | Pace | .................... H04N 13/189 348/E5.031 |

(Continued)

FOREIGN PATENT DOCUMENTS

| | | |
|---|---|---|
| DE | 19629484 A1 | 1/1998 |
| EP | 3836535 A1 | 6/2021 |
| JP | 2004271570 A | 9/2004 |

(Continued)

OTHER PUBLICATIONS

German Search Report issued in Application No. 10 2021 119 161.0 dated Mar. 29, 2022.

(Continued)

*Primary Examiner* — Rodney E Fuller
(74) *Attorney, Agent, or Firm* — Amster, Rothstein & Ebenstein LLP (57) ABSTRACT

In a control device for a motion picture camera that has a record button and a control circuit connected to the record button, the control circuit is configured to cause a start of a motion picture recording in response to a first actuation of the record button. In a normal recording mode, the control device causes a termination of the motion picture recording in response to a second actuation of the record button. In a tail slate mode, the control device, in contrast, only causes a termination of the motion picture recording when first a second actuation of the record button takes place and then a third actuation of the record button takes place.

17 Claims, 4 Drawing Sheets

(56) References Cited

U.S. PATENT DOCUMENTS

2018/0176500 A1* 6/2018 Yokomitsu ............ B60R 25/305

FOREIGN PATENT DOCUMENTS

| JP | 2007124178 A | 5/2007 |
| JP | 2012100216 A | 5/2012 |
| JP | 5370062 B2 | 12/2013 |
| JP | 2016219964 A | 12/2016 |
| JP | 2018101900 A | 6/2018 |

OTHER PUBLICATIONS

European Search Report issued in Application No. 22186624.8, dated Dec. 9, 2022.

* cited by examiner

CONTROL DEVICE FOR A MOTION PICTURE CAMERA AND CONTROL METHOD

The present invention relates to a control device for a motion picture camera, said control device having a record button and a control circuit connected to the record button, and to a control method for a motion picture camera with which a record button is associated.

Conventional or electronic motion picture cameras are used in cinematographic productions (also designated as film productions). A digital motion picture camera comprises an electronic image sensor for generating image signals and a signal output for outputting the image signals and/or a memory for storing the image signals during a motion picture recording. The image sensor generates the image signals in dependence on incident light. The image sensor may have a two-dimensional matrix of light-sensitive sensor elements, in particular having a color filter arrangement, for example in accordance with the Bayer pattern (RGGB). The motion picture camera may have an integrated objective (lens), which images a scene on the image sensor, or a lens mount for fastening an interchangeable lens. Said frames may, for example, be respective full frames or half-frames that only include a complete image content together with other half-frames.

The start and the end of a motion picture recording may be caused by a control device that may be an integral part of the motion picture camera. Alternatively or additionally, the control device may also be part of a remote control unit separate from the motion picture camera, such as is known from DE 196 29 484 A1. Such a remote control unit may be provided to control the motion picture camera for the motion picture recording and to additionally set recording parameters such as the frame rate or the shutter speed of the camera, or the aperture (f-stop), the focus distance (focus), or the focal length (zoom factor) of the camera lens. The control device may have a record button ("REC" button) and control circuit connected thereto. In a toggle mode, a multiple manual actuation of the record button may alternately trigger the start and the end of a respective motion picture recording.

In cinematographic productions, a large number of motion picture sequences and usually also of associated sound sequences are first recorded, wherein a selection, a processing, and a structuring of the recorded image material and sound material take place as part of a post-production in order to give the produced film its final form. This post-processing is also designated as film editing or synonymously as film montage, montage, or editing. To carry out the film editing, it is necessary to already mark the different recorded motion picture sequences during the recording such that they may be identified without problem during the later post-processing.

To mark a motion picture sequence, i.e. a film scene with the motif to be recorded, a so-called clapperboard is frequently used. Traditional clapperboards comprise a slate that may be marked with the identification information to be recorded. Furthermore, a clapperboard has two bars that may be struck together to produce a striking sound. If they are recorded with separate devices, image and sound may hereby be synchronized. If this is not required, the identification information may be written on a simple slate that is recorded by the motion picture camera.

The clapperboard or slate with the identification information is usually held in the field of view of the motion picture camera at the start of the recording of a respective motion picture sequence. The clapperboard or slate is then removed again such that the camera may now record the motion picture sequence that is actually of interest.

However, this approach is not practical in certain situations. For example, the camera work may start at an inaccessible location, for instance when the motion picture camera is mounted at a crane and is positioned at an inaccessible location at the start of the motion picture sequence to be recorded. In such cases, it has proven to be useful to capture the clapperboard or slate only at the end of the motion picture sequence to be recorded. This means that the camera first records the motion picture sequence that is actually of interest, but then has to remain activated in order also to record the clapperboard or slate with the identification information within the same motion picture recording. In this alternative approach, the clapperboard or slate is designated as the tail slate. With this approach, there is, however, the risk that in practice, e.g. out of habit, the motion picture recording is accidentally terminated after the capture of the actual motion picture sequence and the tail slate is thus no longer recorded within the associated motion picture recording. If the camera is then activated again to start a new motion picture recording for the clapperboard or slate with the identification information, this recording may possibly no longer be easily assigned to the associated motion picture sequence, for instance since a separate data packet is generated and stored for the further recording. In such cases, the recording of the tail slate subsequently has to be manually assigned to the actual motion picture sequence.

It is an object of the invention to provide a control device for a motion picture camera and a corresponding control method that ensure a recording of the tail slate after the actual motion picture sequence within the same motion picture recording as the motion picture sequence.

This object is satisfied by a control device and by a method having the features of the independent claims.

In accordance with a first aspect of the invention, a control device for a motion picture camera has a record button and a control circuit connected to the record button. The control circuit is configured to cause a start of a motion picture recording in response to a first actuation of the record button. Furthermore, the control device is configured to cause a termination of the motion picture recording in a normal recording mode in response to a second actuation of the record button. In a tail slate mode, in contrast, the control device only causes the termination of the motion picture recording when first a second actuation of the record button takes place and then a third actuation of the record button takes place.

The record button may be a button that may be actuated by a user and it may also be designated as a "REC" button. The record button may be connected at least in a technical signal manner to the control circuit and may be attached directly to the motion picture camera or to a location spatially remote from the motion picture camera, e.g. to a remote control unit associated with the motion picture camera.

The control device may be in a standby state (switched on and ready for a motion picture recording) before a respective motion picture recording. For a respective motion picture recording, the control circuit may selectively adopt a normal recording mode or a tail slate mode, in particular due to a corresponding user input, i.e. due to a selection by the user, as will be explained further in the following. The two modes differ in the manner in which a termination of the motion picture recording may be brought about to avoid an accidental too early termination. The tail slate mode designates a special operating mode in which a tail slate is still to be recorded within the same motion picture recording after the actual motion picture sequence.

In the normal recording mode, the motion picture recording may (as usual) be started by a first actuation of the record button. The control circuit may in particular generate a start-of-recording control signal for this purpose (e.g. for a higher-ranking control unit of the camera or another instance of the control circuit itself) on the basis of which the image signals generated by the image sensor of the motion picture camera are output and/or stored. The actuation of the record button may, for example, take place by a cameraman, a camera assistant, or a focus puller. When the control circuit adopts the normal recording mode, the recording may (as usual) be terminated again by a second actuation of the record button. This second actuation of the record button may in particular be that actuation of the record button that follows the first actuation of the record button as the next one. The control circuit may in particular generate an end-of-recording control signal for this purpose (e.g. for the higher-ranking control unit or another instance of the control circuit) on the basis of which the output or storage of the image signals is terminated.

In the tail slate mode of the control circuit, the start of a recording of a motion picture sequence may generally take place in the same manner as in the normal recording mode, i.e. by a first actuation of the record button. In this respect, provision may also be made that the tail slate mode is selected at all by a (e.g. a particularly long) first actuation of the record button, as will be explained further in the following. However, in the tail slate mode, the motion picture recording does not end in response to a second actuation of the record button (as in the normal recording mode); but a third actuation of the record button is necessary that takes place after the second actuation of the record button in time to terminate the motion picture recording. This has the advantage that, after the recording of the actual motion picture sequence, the recording of the tail slate is not forgotten accidentally, namely by a premature termination of the motion picture recording. Rather, after the second actuation of the record button—contrary to common practice—a third actuation of the record button has to take place, which requires a deliberate action of the user. Thus, it cannot be easily overlooked that the tail slate still has be recorded (in the same shot as the motion picture sequence) before the termination of the motion picture recording.

The control circuit in accordance with the invention may, for example, comprise an integrated circuit (IC); a microprocessor; a central processing unit (CPU); an application-specific integrated circuit (ASIC); or a field programmable gate array (FPGA). The record button may, for example, comprise a resilient push button.

Further embodiments of the invention will be named in the following and in the dependent claims.

In some embodiments, the control circuit may be configured to selectively adopt the tail slate mode in response to a user input that takes place before the first actuation of the record button or that corresponds to the first actuation of the record button. For this purpose, in some embodiments, a selection may be made between the normal recording mode and the tail slate mode by the user input. In other embodiments, the normal recording mode may be preset, wherein the tail slate mode is selectively adopted as a result of a user input. Thus, the user may (directly or indirectly) select the desired mode.

The selection whether the control circuit or the motion picture camera is in the normal recording mode or the tail slate mode may take place by the user (cameraman, camera assistant, or focus puller) by a user input. This input may take place before or on the actuation of the record button in time. The user input for setting the mode may, for example, take place via an activation of the normal recording mode or the tail slate mode on a touch-sensitive display at the camera or the remote control unit before the motion picture recording is started by the first actuation of the record button. Alternatively, the selection whether the normal recording mode or the tail slate mode is adopted may also take place by the first actuation of the record button itself, as will be explained in the following.

In some embodiments, the control circuit may be configured, starting from a standby state, to adopt the normal recording mode in response to the first actuation of the record button when the duration of the first actuation is shorter than a predetermined long actuation duration and, in contrast, to adopt the tail slate mode when the duration of the first actuation at least corresponds to the predetermined long actuation duration.

The standby state of the motion picture camera may, for example, be brought about by a switching on of the motion picture camera. The switching on may, for example, take place via an "ON/OFF" button. No motion picture recording takes place yet in the standby state. The long actuation duration corresponds to a threshold value for the adoption of the tail slate mode. The long actuation duration may have a predetermined value of a time duration which the first actuation of the record button at least has to have so that not only the start of a motion picture recording is caused, but the tail slate mode is set. If, in contrast, the first actuation of the record button has a shorter duration than the long actuation duration, the control circuit adopts the normal recording mode or retains the normal recording mode (in particular as a default). Thus, on the first actuation of the record button (for the starting of the motion picture recording), the user may simultaneously select the desired mode, namely by a relatively short or a relatively long actuation of the record button. The long actuation duration may in particular have a value from the range 1 to 4 seconds, for example the value 1 second, or 1.5 seconds, or 2 seconds, or 3 seconds.

Alternatively thereto, the setting of a normal recording mode or a tail slate mode may take place by means of a separate selection device, e.g. a switch (physical or virtual, for instance at a display).

In some embodiments, the control device may be configured to generate a tail slate mode indication signal when the control device adopts the tail slate mode. It may hereby be signaled to a user that the tail slate mode is activated, in particular during the total motion picture recording. The tail slate mode indication signal may be output or displayed at an output device of the control device, for example as a visual mode indication, in particular at the output device explained further in the following. The visual mode indication may be visualized as a symbol of an inverted slate, for example.

In some embodiments, the control circuit may be configured to generate a warning signal in the tail slate mode in response to the second actuation of the record button. In the tail slate mode, the second actuation of the record button—as explained—does not yet lead to a termination of the motion picture recording so that the user does not forget to also record the tail slate (clapperboard or slate with identification information) after the actual motion picture sequence. To remind of this, the control circuit may generate a warning signal that may be output in a variety of manners to be perceived by the user. The warning signal may thus represent the presence of the tail slate mode and remind the user that the tail slate mode is active, i.e. is adopted.

In such an embodiment, the control device may have a visual, acoustic, or haptic output device that is configured to output a visual, acoustic, or haptic warning message in response to the warning signal of the control device. For example, a speaker may be present at the motion picture camera and/or the remote control unit and the warning message may comprise an acoustically perceivable sound signal generated by the speaker. Additionally or alternatively, the motion picture camera and/or the remote control unit may comprise a vibration unit that haptically signals the warning message by a vibration of the vibration unit to the user. A visual warning message may be output by an optical signal generator, for example a light emitting diode, at the motion picture camera and/or at the remote control unit, or may be displayed in text form and/or graphic form at an output device of the motion picture camera and/or the remote control unit. A visual warning message may, for example, also be displayed in text and/or graphic form at a viewfinder monitor of the motion picture camera.

In the tail slate mode, the third actuation of the record button may directly result in the termination of the motion picture recording. Alternatively thereto, in some embodiments, the control circuit may be configured to cause the termination of the motion picture recording in the tail slate mode only when the duration of the third actuation of the record button—or, if applicable, of a further actuation of the record button—at least corresponds to a relatively long actuation duration that is greater than a relatively short actuation duration that is sufficient in the normal recording mode so that the second actuation of the record button brings about the termination of the motion picture recording. Thus, in this embodiment, after the second actuation of the record button, a further actuation (third or fourth, etc.) with at least the relatively long actuation duration is required. Said relatively long actuation duration thus corresponds to a threshold value for the termination of the motion picture recording in the tail slate mode. The relatively long actuation duration may have a predetermined value of a time duration that the third or further actuation of the record button at least has to have so that the termination of the motion picture recording takes place in the tail slate mode, whereas, in the normal recording mode, a shorter time duration of the second actuation of the record button is sufficient (namely said relatively short actuation duration) so that the termination of the motion picture recording takes place. Thus, in the tail slate mode, a multiple relatively short actuation of the record button also does not result in an accidental termination of the motion picture recording, but the user has to deliberately hold down the record button during an exceptionally long time duration. Said relatively long actuation duration may correspond to the predetermined long actuation duration already explained and/or said relatively short actuation duration may correspond to the predetermined short actuation duration already explained. The relatively long actuation duration may in particular have a value from the range 1 to 4 seconds, for example the value 1 second, or 1.5 seconds, or 2 seconds, or 3 seconds. The relatively short actuation duration may in particular have a value that is less than the respective relatively long actuation duration.

In accordance with a second aspect of the invention, a control device for a motion picture camera has a record button and a control circuit connected to the record button. The control circuit is configured to cause a start of a motion picture recording in response to a first actuation of the record button. Furthermore, the control circuit is configured to cause a termination of the motion picture recording in a normal recording mode in response to a second actuation of the record button, with it being sufficient if the duration of the second actuation corresponds to a predetermined short actuation duration. In a tail slate mode, in contrast, the control circuit causes the termination of the motion picture recording in response to a second or further actuation of the record button only when the duration of the second or further actuation at least corresponds to a predetermined long actuation duration that is greater than the predetermined short actuation duration.

The advantages and embodiments explained in connection with the first invention aspect also apply analogously to the second invention aspect.

The record button may in particular be a button that may be actuated by a user (e.g. at the motion picture camera or at an associated remote control unit). The control device may be in a standby state before a respective motion picture recording. For a respective motion picture recording, the control circuit may selectively adopt a normal recording mode or a tail slate mode, in particular due to a corresponding user input, i.e. due to a selection by the user.

In the normal recording mode, the motion picture recording may be started by a first actuation of the record button, wherein the control circuit may in particular generate a start-of-recording control signal. When the control circuit adopts the normal recording mode, the recording may (as usual) be terminated by a second actuation of the record button again, wherein it is sufficient if the duration of the second actuation is relatively short (at least corresponding to a predetermined short actuation duration). The control circuit may generate an end-of-recording control signal for this purpose.

In the tail slate mode of the control circuit, in contrast, the motion picture recording only ends when a second or further actuation of the record button has a duration that at least corresponds to a predetermined long actuation duration, wherein this long actuation duration is greater than the predetermined short actuation duration of the normal recording mode. This has the advantage that, after the recording of the actual motion picture sequence, the recording of the tail slate is not forgotten accidentally, namely by a premature termination of the motion picture recording. Rather, the user has to deliberately hold down the record button during an exceptionally long time duration to bring about a termination of the motion picture recording. Thus, it cannot be easily overlooked that the tail slate still has to be recorded (in the same motion picture recording as the motion picture sequence) before the termination of the motion picture recording.

The long actuation duration may in particular have a value from the range 1 to 4 seconds, for example the value 1 second, or 1.5 seconds, or 2 seconds, or 3 seconds. The short actuation duration may in particular have a value that is greater than zero seconds (for example, 0.1 seconds), i.e. with respect to the short actuation duration, it is in particular important to be able to reliably detect a deliberate actuation of the record button in order to terminate the motion picture recording in the normal recording mode. However, the short actuation duration required for this purpose is shorter (preferably considerably shorter) than the long actuation duration that is required in the tail slate mode to terminate the motion picture recording.

In the second invention aspect, the control circuit may also be configured to selectively adopt the tail slate mode in response to a user input that takes place before the first actuation of the record button or that corresponds to the first actuation of the record button. For this purpose, in some embodiments, a selection may be made between the normal recording mode and the tail slate mode by the user input. In other embodiments, the normal recording mode may be preset, wherein the tail slate mode is selectively adopted as a result of a user input. Thus, the user may (directly or indirectly) select the desired mode.

In a possible embodiment of such a kind, the control circuit may be configured, starting from a standby state, to adopt the normal recording mode in response to the first actuation of the record button when the duration of the first actuation is shorter than the predetermined long actuation duration and, in contrast, to adopt the tail slate mode when the duration of the first actuation at least corresponds to the predetermined long actuation duration. Alternatively thereto, the setting of a normal recording mode or a tail slate mode may take place by means of a separate selection device.

In some embodiments, the control device may be configured to generate a tail slate mode indication signal when the control device adopts the tail slate mode. It may hereby be signaled to a user that the tail slate mode is activated.

In some embodiments, the control circuit may be configured to generate a warning signal in the tail slate mode in response to the second or further actuation of the record button when the duration of the second or further actuation is shorter than the predetermined long actuation duration. In the tail slate mode, too short a second or further actuation of the record button—as explained—does not yet lead to a termination of the motion picture recording so that the user does not forget to still record the tail slate (clapperboard or slate with identification information) after the actual motion picture sequence. To remind of this, the control circuit may generate a warning signal that may be output in a variety of manners to be perceived by the user.

In such an embodiment, the control device may have a visual, acoustic, or haptic output device that is configured to output a visual, acoustic, or haptic warning message in response to the warning signal.

The invention also relates to a motion picture camera having a control device of the type explained (in accordance with the first or second invention aspect).

The motion picture camera may comprise an integrated optical system (camera lens) or a lens mount for mounting an interchangeable lens. The motion picture camera may further have an electronic image sensor for generating image signals from incident light. Furthermore, the motion picture camera may comprise an image signal processing device for generating a digital image data stream from the image signals.

The motion picture camera may have a signal output and/or a memory for outputting or storing the image signals during the motion picture recording.

The invention further relates to a remote control unit for a motion picture camera comprising a control device of the type explained (in accordance with the first or second invention aspect).

Such a remote control unit may be configured to set a conventional or an electronic motion picture camera to record motion picture recordings and/or to set recording parameters such as the frame rate or the shutter speed of the camera, or the aperture (f-stop), the focus distance (focus), or the focal length (zoom factor).

The remote control unit may have a base part and an operating element that is movable relative to the base part, e.g. an adjustment wheel, for setting lens control commands in accordance with the rotational position, wherein the remote control unit generates corresponding lens control signals and transmits them to the motion picture camera or corresponding lens setting motors of the camera.

The invention also relates to a method of controlling a motion picture camera with which a record button is associated. In accordance with the first invention aspect, the method may comprise the following steps: starting a motion picture recording in response to a first actuation of the record button; terminating the motion picture recording in response to a second actuation of the record button if a normal recording mode is adopted; and terminating the motion picture recording only in response to a second actuation and a subsequent third actuation of the record button if a tail slate mode is adopted.

An adoption of the tail slate mode may selectively take place, in particular as a result of a user input, before or on the start of the motion picture recording in response to the first actuation of the record button. For this purpose, in some embodiments, a selection may be made between the normal recording mode and the tail slate mode. In other embodiments, the normal recording mode may be preset, wherein the tail slate mode is selectively adopted as a result of a user input.

The advantages and further embodiments explained in connection with the control device in accordance with the first invention aspect also apply analogously to the control method.

The invention further relates to a method of controlling a motion picture camera with which a record button may be associated, wherein the method in accordance with the second invention aspect comprises the following steps: starting a motion picture recording in response to a first actuation of the record button; and—if a normal recording mode is adopted—terminating the motion picture recording in response to a second actuation of the record button, with it being sufficient if the duration of the second actuation corresponds to a predetermined short actuation duration; and—if a tail slate mode is adopted—terminating the motion picture recording in response to a second or further actuation of the record button only when the duration of the second or further actuation at least corresponds to a predetermined long actuation duration that is greater than the predetermined short actuation duration.

An adoption of the tail slate mode may selectively take place, in particular as a result of a user input, before or on the start of the motion picture recording in response to the first actuation of the record button. For this purpose, in some embodiments, a selection may be made between the normal recording mode and the tail slate mode. In other embodiments, the normal recording mode may be preset, wherein the tail slate mode is selectively adopted as a result of a user input.

The advantages and further embodiments explained in connection with the control device in accordance with the second invention aspect also apply analogously to the control method.

The invention will be described in the following with reference to embodiments and to the drawings.

Figure 1:
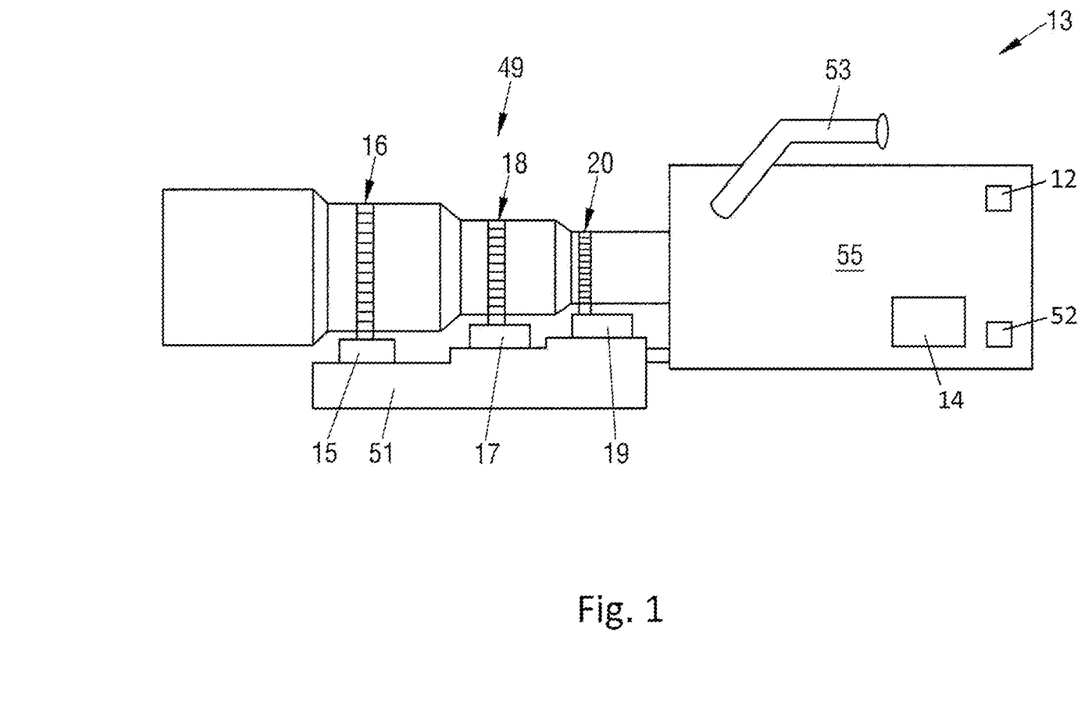
FIG. 1 shows a schematic representation of a motion picture camera with a control device and a record button.

FIG. 1 shows a motion picture camera 13 having a camera body 55 at which an interchangeable lens 49 is mounted. This interchangeable lens 49 has three lens rings 16, 18, and 20 that may be adjusted by means of respective external lens setting motors 15, 17, and 19. For example, the first lens ring 16 may in this respect be provided to set the focal distance of the lens 49, while a desired focal length setting may, for example, be performed by rotating the second lens ring 18. Furthermore, the third lens ring 20 may in particular be provided to be able to set an aperture (f-stop) by means of the associated third lens setting motor 19. The setting motors 15, 17, and 19 are in this respect part of a lens ring drive unit 51 that is connected to the camera body 55 (e.g. via holding rods). The lens ring drive unit 51 may comprise a communication interface for receiving setting motor control signals.

Furthermore, a viewfinder 53 is arranged at the camera body 55, by means of which viewfinder 53 a cameraman guiding the motion picture camera 13 may focus on an image section to be recorded. The motion picture camera 13 furthermore has a record button 12, a control circuit 14, and a visual output device 52.

During a recording of a scene, provision is usually made that the camera 13 or its lens 49 is moved by a cameraman to focus on a respective image section to be recorded. Corresponding adaptations of the recording parameters which possibly have to be made on such a change of the image section, for example of the focal distance, are in contrast usually performed by a camera assistant or a focus puller by means of a remote control unit 11 whose possible design is illustrated in FIG. 2.

In this respect, the motion picture camera 13 shown here with the lens 49 only serves for the illustration. In general, the remote control unit 11 may also be configured to set other types of motion picture cameras 13 or other types of lenses 49 in a remote-controlled manner that may, for example, have integrated lens setting motors instead of the lens rings 16, 18, 20 rotatable from the outside for the external setting motors 15, 17, 19.

Figure 2:
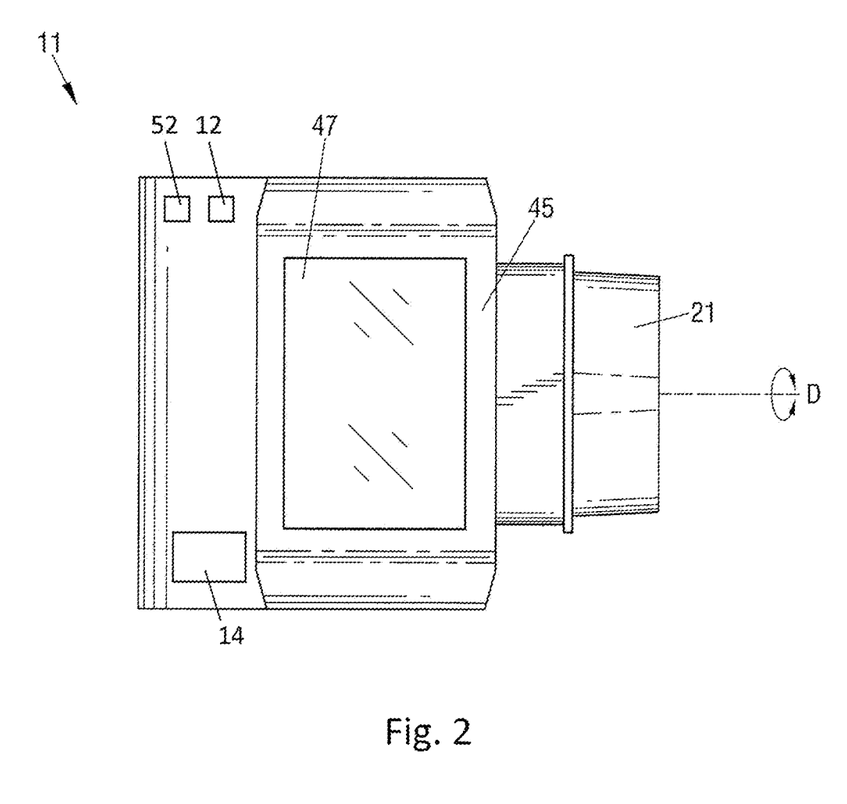
FIG. 2 shows an exemplary representation of a remote control unit for a motion picture camera with a control device and a record button.

The remote control unit 11 shown in FIG. 2 has an operating element 21 that is configured as an adjustment wheel and that is rotatable about an axis of rotation D relative to a base part 45. Due to the rotation of the operating element 21 or to the change of its rotational position relative to the base part 45, control commands for the camera 13 may in this respect be set that are transmitted as setting motor control signals to the motion picture camera 13 or to the associated lens ring drive unit 51 having the lens setting motors 15, 17, and 19. Similarly to the motion picture camera 13, the remote control unit 11 may comprise a record button 12, a control circuit 14, and a visual (and/or acoustic and/or haptic) output device 52.

The control circuit 14 of the motion picture camera 13 and/or the control circuit 14 of the remote control unit 11 may be configured to selectively adopt a normal recording mode or a tail slate mode. The two modes differ in the manner in which a termination of a motion picture recording may be brought about.

Figure 3:
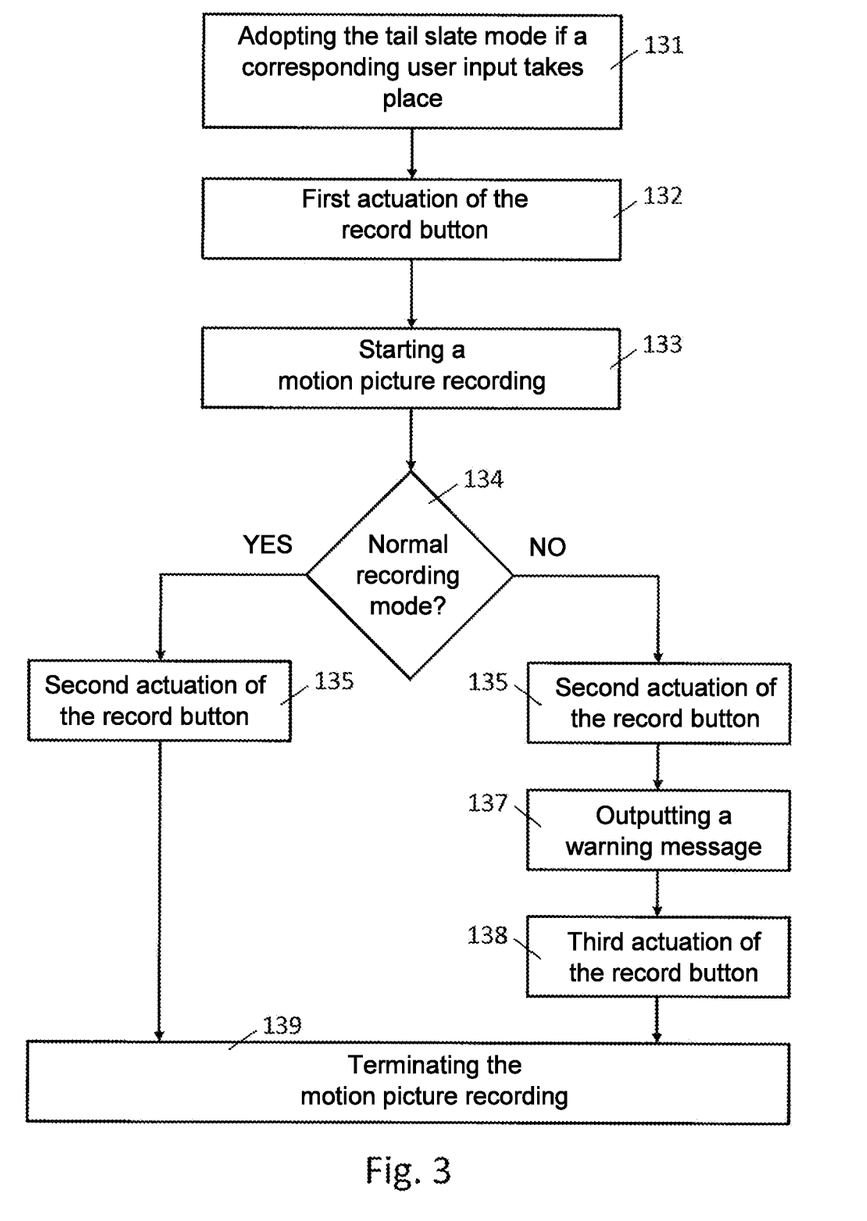
FIG. 3 shows a flowchart for a method of controlling a motion picture camera.
Figure 4:
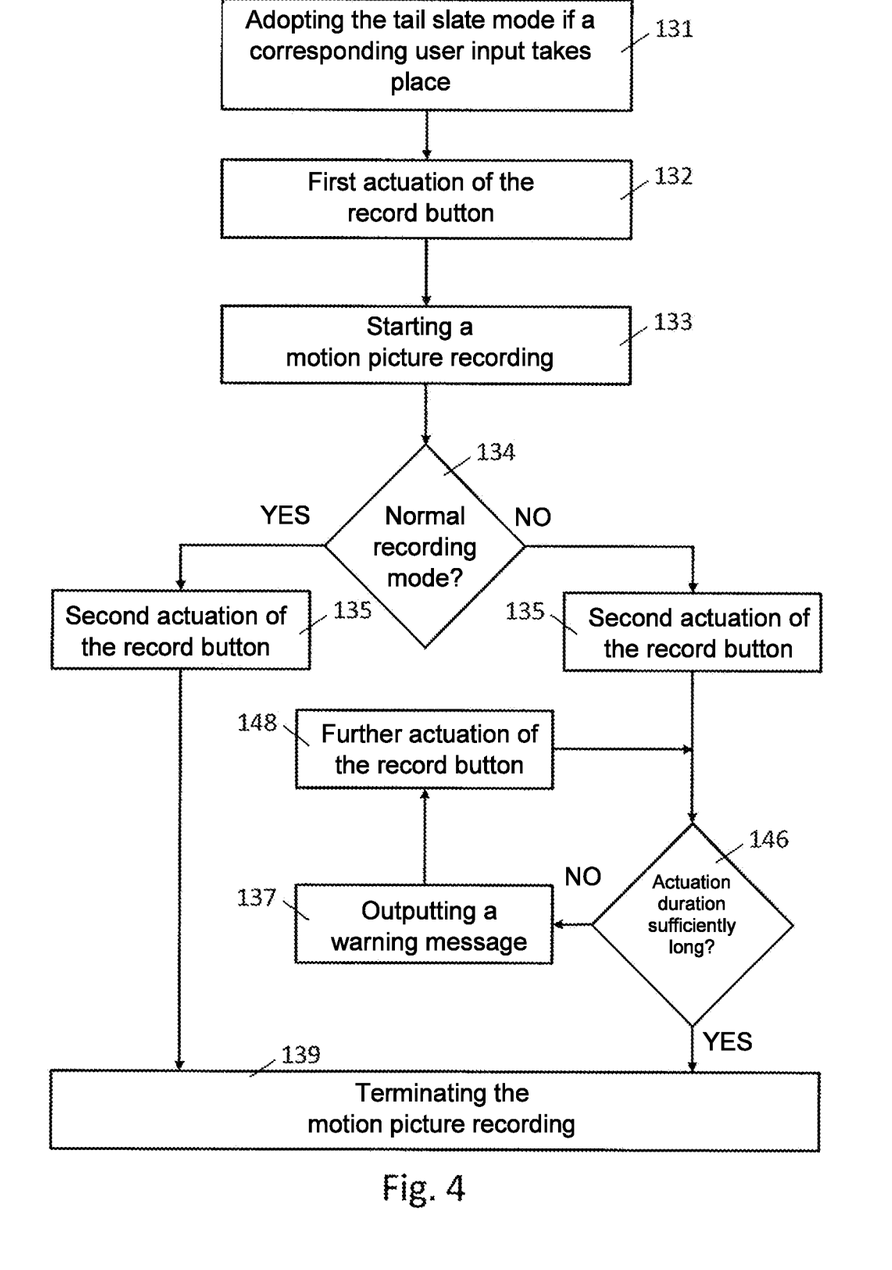
FIG. 4 shows a flowchart for an alternative method of controlling a motion picture camera.

With further reference to FIGS. 3 and 4, the control circuit 14 of the motion picture camera 13 and/or the control circuit 14 of the remote control unit 11 may be configured such that a start 133 of a motion picture recording is caused in response to a first actuation 132 of the record button 12. A selection as to whether a normal recording mode or a tail slate mode is to be adopted may take place by a user input 131 before or on the first actuation 132 of the record button 12. The user input 131 may take place via a switch (not shown), a display device 47 (cf. FIG. 2, for example a touch-sensitive display), or the record button 12. The control circuit 14 may further be configured generally to cause a termination 139 of the motion picture recording in the normal recording mode in response to a second actuation 135 of the record button 12. The control circuit 14 may further be configured to cause a termination 139 of the motion picture recording in the tail slate mode, in contrast, only when first a second actuation 135 of the record button 12 takes place and then a third actuation 138 of the record button 12 takes place (first invention aspect) or to cause a termination 139 of the motion picture recording in the tail slate mode only when the duration of a second actuation 135 of the record button 12 (or, if applicable, of a further actuation 148 of the record button) is sufficiently long, in particular longer than the sufficient actuation duration provided in the normal recording mode (second invention aspect). In both invention aspects, the advantage results that the recording of the tail slate is not accidentally forgotten, namely by a premature termination of the motion picture recording, in the tail slate mode after the recording of the actual motion picture sequence. Rather, an exceptional second actuation 135 or an additional actuation 148 of the record button 12 has to take place to terminate the motion picture recording, which requires a deliberate action of the user. Thus, the tail slate may be reliably captured within the same motion picture recording as the actual motion picture sequence.

The control circuit 14 may furthermore be configured such that a warning signal is generated in the tail slate mode after the second actuation 135 or after a too short second actuation 135 or a further actuation 148 of the record button 12 and this warning signal is output in the form of a visual, acoustic, or haptic warning message at the output device 52 (FIGS. 1 and 2) or is displayed at the display device 47 (FIG. 2).

FIG. 3 shows a flowchart for an exemplary method of controlling a motion picture camera in accordance with the first invention aspect. In an initial state, a normal recording mode or a tail slate mode may be adopted if a corresponding user input takes place (step 131), wherein the normal recording mode may be provided as the default setting and the tail slate mode is adopted only as a result of a specific user input 131. The user input 131 may take place before the first actuation 132 of the record button 12 or may correspond to the first actuation 132 of the record button 12 (e.g. an exceptionally long-lasting first actuation 132 of the record button 12). A motion picture recording may start (step 133) after the first actuation 132 of the record button 12. In a step 134, a query takes place as to whether the normal recording mode has been adopted. Once the normal recording mode has been adopted, a second actuation 135 of the record button 12 may result in a termination 139 of the motion picture recording. If, in contrast, the normal recording mode is not adopted, i.e. the query 134 is negated, the tail slate mode is adopted.

A second actuation 135 of the record button 12 does not directly result in a termination 139 of the motion picture recording in the tail slate mode. Instead, a warning message may first be output in a step 137 after the second actuation 135 of the record button 12. The warning message may remind the user that the tail slate mode has been adopted and the motion picture recording has not been terminated by the second actuation 135 of the record button 12. Therefore, at this point in time, the clapperboard or slate with the identification information may be held in the field of view of the motion picture camera. A termination 139 of the motion picture recording only takes place after a third actuation 138 of the record button 12, wherein, in accordance with an embodiment, provision may also be made that this third actuation 138 has to last for an exceptionally long time.

After the termination 139 of the motion picture recording, the tail slate mode may be automatically switched off so that an adoption of the normal recording mode or of the tail slate mode is to be selected again by a user input 131 before the next actuation of the record button 12. Alternatively, the normal recording mode may be preset after the automatic termination of the tail slate mode.

FIG. 4 shows a flowchart for a method of controlling a motion picture camera in accordance with the second invention aspect. The steps described in FIG. 3 of adopting 131 the tail slate mode, of the first actuation of the record button (step 132), of starting the motion picture recording (step 133), and of querying 134 whether the normal recording mode has been adopted may be identical. In this alternative method, the termination 139 of the motion picture recording may be brought about in the normal recording mode by a second (relatively short) actuation 135 of the record button 12.

However, if the tail slate mode is adopted, a query 146 of the actuation duration of the record button 12 may take place on or after a second actuation 135 of the record button 12. The detected actuation duration of the record button 12 may be compared with a threshold value (a so-called predetermined long actuation duration). If the duration of the second actuation 135 is sufficiently long, i.e. if the second actuation 135 of the record button 12 has at least been performed for the predetermined long actuation duration, the termination of the motion picture recording thus takes place in the step 139. Otherwise, if the second actuation 135 of the record button 12 has not been performed for the predetermined long actuation duration, but for a shorter duration, a warning message is output in a step 137. The warning message may remind the user that the tail slate mode has been adopted and that a further actuation 148 of the record button with at least an actuation duration greater than the predetermined long actuation duration is necessary for a termination 139 of the motion picture recording. At this point in time, the clapperboard or slate with the identification information may therefore be held in the field of view of the motion picture camera. Only when a further actuation 148 of the record button has taken place with at least an actuation duration greater than the predetermined long actuation duration, the query 146 is affirmed and a termination 139 of the motion picture recording takes place.

After the termination 139 of the motion picture recording, the tail slate mode may be automatically switched off such that an adoption of the normal recording mode or of the tail slate mode is to be selected again by a user input 131 before the next actuation of the record button 12. Alternatively, the normal recording mode may be preset after the automatic termination of the tail slate mode.

REFERENCE NUMERAL LIST

11 remote control unit
12 record button
13 motion picture camera
14 control circuit
15 first lens setting motor
16 first lens ring
17 second lens setting motor
18 second lens ring
19 third lens setting motor
20 third lens ring
21 operating element
45 base part
47 display device
49 interchangeable lens
51 lens ring drive unit
52 output device
53 viewfinder
55 camera body
131 user input
132 first actuation of the record button
133 starting a motion picture recording
134 querying the normal recording mode
135 second actuation of the record button
137 outputting a warning message
138 third actuation of the record button
139 terminating the motion picture recording
146 querying the actuation duration
148 further actuation of the record button

The invention claimed is:

1. A control device for a motion picture camera, said control device having a record button and a control circuit connected to the record button, wherein the control circuit is configured
   to cause a start of a motion picture recording in response to a first actuation of the record button;
   to cause a termination of the motion picture recording in a normal recording mode in response to a second actuation of the record button;
   to cause a termination of the motion picture recording in a tail slate mode, in contrast, only when first a second actuation of the record button takes place and then a third actuation of the record button takes place; and
   to selectively adopt the tail slate mode in response to a user input that takes place before the first actuation of the record button or that corresponds to the first actuation of the record button.

2. A control device in accordance with claim 1,
   wherein the control circuit is configured, starting from a standby state, to adopt the normal recording mode in response to the first actuation of the record button when the duration of the first actuation is shorter than a predetermined long actuation duration and, in contrast, to adopt the tail slate mode in response to the first actuation of the record button when the duration of the first actuation at least corresponds to the predetermined long actuation duration.

3. A control device in accordance with claim 1,
   wherein the control device is configured to generate a tail slate mode indication signal when the control device adopts the tail slate mode.

4. A control device in accordance with claim 1,
   wherein the control circuit is configured to generate a warning signal in the tail slate mode in response to the second actuation of the record button.

5. A control device in accordance with claim 4,
   wherein the control device comprises a visual, acoustic, or haptic output device that is configured to output a visual, acoustic, or haptic warning message in response to the warning signal.

6. A control device in accordance with claim 1,
   wherein the control circuit is configured to cause the termination of the motion picture recording in the tail slate mode only when the duration of the third actuation or the duration of a further actuation of the record button at least corresponds to a relatively long actuation duration that is greater than a relatively short actuation duration, the relatively short actuation duration being sufficient in the normal recording mode so that the second actuation of the record button brings about the termination of the motion picture recording.

7. A motion picture camera comprising a control device in accordance with claim 1.

8. A remote control unit for a motion picture camera comprising a control device in accordance with claim 1.

9. A control device for a motion picture camera that comprises a record button and a control circuit connected to the record button, wherein the control circuit is configured
- to cause a start of a motion picture recording in response to a first actuation of the record button;
- to cause a termination of the motion picture recording in a normal recording mode in response to a second actuation of the record button, wherein it is sufficient if the duration of the second actuation corresponds to a predetermined short actuation duration;
- to cause a termination of the motion picture recording in a tail slate mode in response to a second or a further actuation of the record button, in contrast, only when the duration of the second or further actuation at least corresponds to a predetermined long actuation duration that is greater than the predetermined short actuation duration; and
- to selectively adopt the tail slate mode in response to a user input that takes place before the first actuation of the record button or that corresponds to the first actuation of the record button.

10. A control device in accordance with claim 9,
wherein the control circuit is configured, starting from a standby state, to adopt the normal recording mode in response to the first actuation of the record button when the duration of the first actuation is shorter than the predetermined long actuation duration and, in contrast, to adopt the tail slate mode in response to the first actuation of the record button when the duration of the first actuation at least corresponds to the predetermined long actuation duration.

11. A control device in accordance with claim 9,
wherein the control device is configured to generate a tail slate mode indication signal when the control device adopts the tail slate mode.

12. A control device in accordance with claim 9,
wherein the control circuit is configured to generate a warning signal in the tail slate mode in response to the second or further actuation of the record button when the duration of the second or further actuation is shorter than the predetermined long actuation duration.

13. A control device in accordance with claim 12,
wherein the control device has a visual, acoustic, or haptic output device that is configured to output a visual, acoustic, or haptic warning message in response to the warning signal.

14. A motion picture camera comprising a control device in accordance with claim 9.

15. A remote control unit for a motion picture camera comprising a control device in accordance with claim 9.

16. A method of controlling a motion picture camera with which a record button is associated, comprising the steps:
- starting a motion picture recording in response to a first actuation of the record button;
- if a normal recording mode is adopted, terminating the motion picture recording in response to a second actuation of the record button;
- if a tail slate mode is adopted, terminating the motion picture recording only in response to a second actuation and a subsequent third actuation of the record button; and
- selectively adopting the tail slate mode in response to a user input.

17. A method of controlling a motion picture camera with which a record button associated, comprising the following steps:
- starting a motion picture recording in response to a first actuation of the record button;
- if a normal recording mode is adopted, terminating the motion picture recording in response to a second actuation of the record button, wherein it is sufficient if the duration of the second actuation corresponds to a predetermined short actuation duration;
- if a tail slate mode is adopted, terminating the motion picture recording in response to a second or a further actuation of the record button only when the duration of the second or further actuation at least corresponds to a predetermined long actuation duration that is greater than the predetermined short actuation duration; and
- selectively adopting the tail slate mode in response to a user input.

* * * * *